United States Patent Office
2,695,894
Patented Nov. 30, 1954

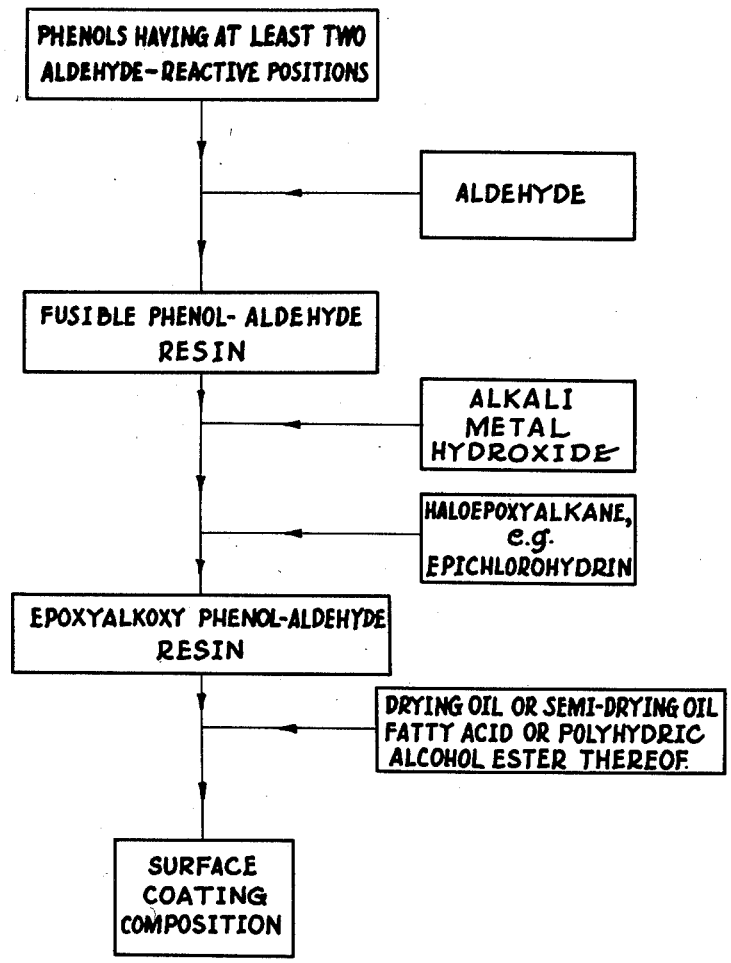

2,695,894

POLYMERIC COMPOSITIONS

Gaetano F. D'Alelio, Pittsburgh, Pa., assignor to Koppers Company, Inc., a corporation of Delaware Application May 27, 1950, Serial No. 164,844

19 Claims. (Cl. 260—19)

This invention relates to new polymeric products. More specifically it relates to polymeric compositions suitable for surface coatings, which compositions comprise phenolic-aldehyde epoxyalkyl ether resins, hereinafter referred to as epoxyalkoxy aryl resins, modified by condensation with unsaturated materials, such as drying oil fatty acids or esters thereof. The unmodified epoxyalkoxy aryl resins are disclosed and claimed in applicant's copending patent applications, Serial Nos. 164,840, 164,842 and 164,843, filed the same date as the present application.

For use as a surface coating material, it is desirable that a normally resinous material be made less viscous, that is by solution or by other means, so as to be easily applied to surfaces and thereafter rendered in a short time under relatively mild or easily effected conditions to a tack-free, abrasion-resistant, caustic-resistant, solvent- and chemical-resistant, durable film.

It has now been found that polymeric compositions having such properties can be prepared by the condensation of a drying oil or semi-drying oil fatty acid or a polyhydric alcohol ester thereof with polymeric materials represented at least in part by the formula

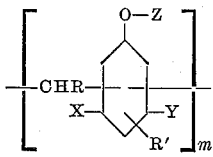

wherein:

R is a member of the class consisting of hydrogen and alkyl, alkylene, aryl, aralkyl, alkaryl, cycloalkyl and furyl groups;
X and Y are substituents selected from the class consisting of hydrogen, chlorine, and alkyl and hydroxy groups;
R' is a substituent of the class consisting of hydrogen, chlorine and hydrocarbon groups such as alkyl, aryl, aralkyl, alkaryl, cycloalkyl, etc.;
$m$ is an integer having a value of at least 3; and
Z is a substituent of the class consisting of hydrogen and epoxyalkyl groups, at least one Z per polymer molecule being an epoxyalkyl group and said epoxyalkyl groups having the formula

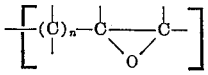

wherein $n$ is an integer having a value advantageously no greater than 8, and the unoccupied valences within the bracket of the formula are satisfied by substituents of the class consisting of hydrogen and alkyl groups of no more than 7 carbon atoms, the number of carbon atoms in any epoxyalkyl group totaling no more than 10 carbon atoms.

The epoxyalkoxy aryl resins suitable for the practice of this invention can be prepared, in accordance with more complete disclosures given in the above-mentioned copending applications, by the reaction of a thermoplastic phenolic-aldehyde resin of a phenol having the formula

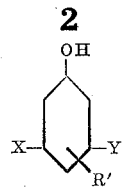

(wherein X, Y and R' are as described above) with a halo-epoxy alkane of the formula

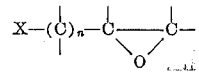

where X is a halogen atom, such as chlorine, bromine, etc., $n$ is an integer having a value advantageously no greater than 8, and the unoccupied valences of the formula are satisfied by substituents of the class consisting of hydrogen and alkyl groups of not more than 7 carbon atoms, the number of carbon atoms in any epoxyalkyl group totaling no more than 10 carbon atoms. When one phenolic hydroxy group per phenolic unit of the thermoplastic phenolic-aldehyde resin is replaced by an epoxyalkoxy group, the molecular structure of the resultant resin product is believed to be represented at least in part by recurring units having the formula

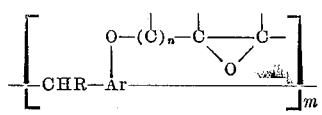

where:

Ar represents the aromatic group derived from the phenolic starting compound;
R is hydrogen or an alkyl, alkylene, aryl, aralkyl, alkaryl, cycloalkyl or furyl group;
$n$ is an integer having a value advantageously no greater than 8; and
$m$ is an integer having a value of at least 3.

Copending patent application Serial No. 164,843 discloses and claims the epoxyalkoxy aryl resins prepared from hydrocarbon-substituted phenols, such as p-cresol, etc., having two available positions ortho or para to a phenolic hydroxy group for aldehyde condensation. Copending patent application Serial No. 164,840 covers such resins from chlorine-substituted phenols, such as p-chlorophenol, m-chloro-p-cresol, etc. having two available ortho-para positions for aldehyde substitution. Copending patent application Serial No. 164,842 covers such resins from phenols having three available ortho-para positions, such as phenol, m-cresol, etc. for aldehyde substitution in which the condensation is controlled by aldehyde concentration to give thermoplastic fusible resins. Further examples of such phenols, the aldehydes reacted therewith and suitable haloepoxyalkanes are listed hereinafter.

The drying oil and semi-drying oil fatty acid compositions mentioned above include the free fatty acids and esterification products of the fatty acids with polyhydric alcohols. Such fatty acids are the acids derived from linseed, dehydrated castor, tung, perilla, soybean, oiticica, fish, hempseed, poppyseed, sun flower oils, etc. Together with these fatty acid compositions may be used minor amounts of non-drying oil fatty acids, resin acids, such as rosin, etc., and polybasic carboxylic acids. Suitable esterification products of the fatty acids are the original drying and semi-drying oils, polyhydric alcohols partially esterified by such fatty acids, or drying or semi-drying oils modified by polyhydric alcohols, such as fatty acid mono- and di-glycerides, pentaerythritol, di- and tri-esters of linseed, dehydrated castor oil fatty acids, etc., pentaerythritol-modified linseed oil, etc., and such partially esterified polyhydric alcohols partially reacted with polybasic carboxylic acids, such as maleic, phthalic, succinic, adipic, fumaric, etc.

It is often advantageous to use mixtures of such acids in order to modify the properties and gain particular advantages imparted by each type of ester. For example linseed fatty acids esterify easily and give good drying characteristics; dehydrated castor oil fatty acids give improved chemical resistance and good baking characteristics. The amount of fatty acid or fatty acid derivative which may be combined chemically with the epoxyalkoxy aryl resin depends on the equivalent weight of the resin as can be determined by simple esterification tests with excess acid and titration of the excess unesterified acid. It is not necessary to use the full equivalent weight of fatty acid since amounts less than the full equivalent weight of fatty acid can be used to give products of desirable properties.

For the efficient reduction of acid number and in order to avoid undesirable bodying or gelation and color formation, esterification of the epoxyalkoxy aryl resins with the fatty acids is advantageously carried out in closed kettles equipped to provide an inert gas blanket and water removal by azeotropic solvent distillation or by bubbling an inert gas through the reaction mass. In some cases, as with rosin, conventional open kettle equipment may be used.

The epoxyalkoxy aryl resins are usually insoluble in the fatty acids, varnish oils, partially and completely esterified polyhydric alcohols, etc. at room temperatures but become reactive and soluble at increased temperatures, e. g., for example with varnish oils at about 480–580° F. The reaction is advantageously conducted at least to a stage where the materials become compatible and form a homogeneous composition, or to any advanced stage of reaction to give a desired viscosity. Esterification can be continued until a desired acid number or degree of cure is obtained. The product may then be thinned with solvents to a desired viscosity, pigmented and colored according to conventional methods and equipment such as ball mills, roll mills, etc., and subsequently air-dried with ordinary paint driers, that is, metallic soaps, such as lead and cobalt naphthenates, lead and cobalt 2-ethyl-hexoate, etc., advantageously in concentrations of about 0.4% cobalt and about 0.2% lead based on the amount of solids in the solution. The products may also be baked at various temperatures, for example at 300° F. for about 25–30 minutes, to give suitable, hardened surface coatings. The hardened surface coating material of this invention has good caustic resistance, abrasion resistance, water resistance, adhesion, mar resistance, durability and appearance.

The following examples illustrates procedures by which compositions of the present invention may be prepared.

*Example I*

Fifty parts by weight of an epoxyalkoxy aryl resin of this invention made from p-cresol, formaldehyde and epichlorohydrin and having an equivalent weight of approximately 175 is heated with 50 parts by weight of linseed fatty acids in a closed strainless steel kettle equipped with an agitator, a means for introducing an inert gas below the surface of the liquid contents and a gas outlet means. The mixture is heated until a molten mass is produced at which time the agitator is started and the temperature is increased to 480° F. After the temperature is held at 480° F. for about an hour, a stream of nitrogen is slowly passed through the reaction mass and the temperature held at 480° F. Samples are removed from time to time in order to check the viscosity or cure test. When the viscosity is approximately F (Gardner-Holt) at 40 percent solids in a 50-50 mixture of toluene and ethanol, the reaction mass is cooled slightly and thinned to a desired solids content with a 50-50 mixture of toluene and ethanol. Such solutions thinned to 65% solids and containing 0.06% cobalt and 0.3% lead as naphthenate driers, based on the solids content, give varnishes of good drying characteristics and film properties.

*Example II*

The procedure of Example I is repeated using 60 parts by weight of the same resin and 40 parts of dehydrated castor oil fatty acids. The temperature is raised gradually to 500° F. before nitrogen is passed through the reaction mass, and the temperature is held at about 500° F. until a viscosity of approximately H to J (Gardner-Holt) at 40% solids in xylene is obtained. The mass is then cooled slightly and thinned with xylene to the desired solids content. With a 55% solids content and 0.66% cobalt and 0.3% lead as naphthenate drier, based on the solids content, varnishes of good drying characteristics and film properties are obtained.

The epoxyalkoxy aryl resin compositions of this invention may be further modified by the addition of reactive hydrogen-containing polymeric materials, such as urea-formaldehyde condensation products, melamine resins, aniline-formaldehyde resins, ethylene diamine-formaldehyde resins, etc. or can be assisted in conversion to hardened surface coatings by the presence of a small percentage of amines. Very efficient amine curing agents are diethyl amine, dibutyl amine, diethylene triamine, piperidine, piperidine benzoate, trimethyl amine, triethyl amine, triethanol amine, methyl di-n-propyl amine, guanidine, guanidine derivatives, etc.

Solvents generally suitable for thinning these resin compositions for surface application include active solvents such as ketones, e. g., acetone, methyl ethyl ketone, etc., esters, e. g., methyl, ethyl and n-butyl acetate, etc., cyclic oxides, e. g., propylene oxide, dioxane, etc., chlorinated compounds, such as chloroform, ethylene dichloride, dichloro-ethyl, ether, etc., Cellosolve acetate, butyl Cellosolve, and in some cases 50-50 mixtures of toluene and alcohols such as ethanol. The surface coatings may be cured to an insoluble, infusible state at ordinary temperatures or at a faster rate at baking temperatures. Such surface coatings have outstanding caustic resistance, general solvent and chemical resistance, hardness coupled with flexibility, abrasion resistance, etc.

Hydrocarbon-substituted phenols having two available positions ortho or para to a phenolic hydroxy group for aldehyde condensation to give fusible resins suitable for the preparation of the epoxyalkoxy aryl resins include o- and p-cresols, o- and p-ethyl phenols, o- and p-isopropyl phenols, o- and p-tert-butyl phenols, o- and p-sec-butyl phenols, o- and p-amyl phenols, o- and p-octyl phenols, o- and p-nonyl phenols, etc., 2,5-xylenol, 3,4-xylenol, 2,5-diethyl phenol, 3,4-diethyl xylenol, 2,5-diisopropyl phenol, 4-methyl resorcinol, 4-ethyl resorcinol, 4-isopropyl resorcinal, 4-tert-butyl resorcinol, etc., o- and p-benzyl phenyl, o- and p-phenethyl phenols, o- and p-phenyl phenols, o- and p-tolyl phenols, o- and p-xylyl pehnols, o- and p-cyclohexyl phenols, o- and p-cyclopentyl phenols, etc., 4-phenethyl resorcinol, 4-tolyl-resorcinol, 4-cyclohexyl resorcinol, etc.

Various chloro-substituted phenols which can also be used in the preparation of phenol-aldehyde resins suitable for the preparation of the epoxyalkoxy aryl resins include o- and p-chloro-phenols, 2,5-dichloro-phenol, 2,3-dichloro-phenol, 3,4-dichloro-phenol, 2-chloro-3-methyl-phenol, 2-chloro-5-methyl-phenol, 3-chloro - 2 - methyl-phenol, 5-chloro-2-methyl-phenol, 3-chloro - 4 - methyl-phenol, 4-chloro-3-methyl-phenol, 4-chloro-3-ethyl-phenol, 4-chloro-3-isopropyl-phenol, 3-chloro-4-phenyl-phenol, 3 - chloro-4-chloro-phenyl-phenol, 3,5 - dichloro-4-methyl-phenol, 3,5-dichloro - 5 - methyl-phenol, 3,5-dichloro - 2 - methyl-phenol, 2,3-dichloro-5-methyl-phenol, 2,5-dichloro-3-methyl-phenol, 3-chloro-4,5-dimethyl-phenol, 4-chloro-3,4-dimethyl-phenol, 2-chloro-3,5-dimethyl-phenol, 5 - chloro-2,3-dimethyl-phenol, 5-chloro-3,4-dimethyl-phenol, 2,3,5-trichloro-phenol, 3,4,5-trichloro-phenol, 4-chloro-resorcinol, 4,5-dichloro-resorcinol, 4-chloro-5-methyl-resorcinol, 5-chloro-4-methyl-resorcinol, etc.

Typical phenols which have more than two positions ortho or para to a phenolic hydroxy group available for aldehyde condensation and which, by controlled aldehyde condensation, can also be used to give fusible resins suitable for the preparation of epoxyalkoxy aryl resins which in turn are satisfactory for use in the present invention are: phenol, m-cresol, 3,5-xylenol, m-ethyl and m-isopropyl phenols, m,m'-diethyl and diisopropyl phenols, m-butyl-phenols, m-amyl phenols, m-octyl phenols, m-nonyl phenols, resorcinol, 5-methyl-resorcinol, 5-ethyl resorcinol, etc.

As condensing agents any aldehyde may be used which will condense with the particular phenol being used, including formaldehyde, acetaldehyde, propionaldehyde, butyraldehyde, heptaldehyde, cyclohexanone, methyl cyclohexanone, cyclopentanone, benzaldehyde, and nuclear alkyl-substituted benzaldehydes, such as toluic aldehyde, etc., naphthaldehyde, furfuraldehyde, glyoxal, acrolein, etc., or compounds capable of engendering aldehydes such as para-formaldehyde, hexamethylene tetramine, etc. The aldehydes can also be used in the form, of a solution, such as the commercially available formalin. More detailed descriptions of preparation conditions and possible modifications are given in the above-mentioned copending patent applications.

While glycidyl ethers, such as derived from epichlorohydrin, are particularly preferred in the practice of this invention, the epoxyalkoxy aryl resins containing epoxyalkoxy groups of a greater number of carbon atoms are also suitable. These are prepared by substituting for epichlorohydrin such representative corresponding chlorides or bromides of monohydroxy epoxyalkanes as 1-chloro-2,3-epoxybutane, 1-chloro-3,4-epoxybutane, 2-chloro-3,4-epoxybutane, 1-chloro-2-methyl-2,3-epoxypropane, 1-bromo-2,3-epoxy-pentane, 2-chloromethyl-1,2-epoxybutane, 1-bromo-4-methyl-3,4-epoxypentane, 1-bromo-4-ethyl-2,3-epoxypentane, 4-chloro-2-methyl-2,3-epoxypentane, 1-chloro-2,3-epoxyoctane, 1-chloro-2-methyl-2,3-epoxyoctane, or 1-chloro-2,3-epoxydecane. Although it is possible to use haloepoxy-alkanes having a greater number of carbon atoms than indicated above, there is generally no advantage in using those having a total of more than 10 carbon atoms.

The number of glycidyl or other epoxyalkyl groups to be added depends on the properties desired in the final product, the number of carboxylic acid groups to be added, the molecular weight and the character of the fusible phenolic-aldehyde resin, etc. Satisfactory properties are often attained when much less than complete substitution of epoxyalkoxy groups for hydroxy groups is effected. Again the results of various percentages of such substitution will vary according to the structure and the molecular weight of the particular fusible phenolic-aldehyde resin being used. With high molecular weight phenolic-aldehyde resins, it is often desirable to have a fewer number of epoxy groups present for further reaction than is the case when low molecular weight resins are used. Moreover, the greater the number of epoxy groups present in the polymer, the greater is the degree of modification of the polymer that generally can be achieved by the addition of the reactive-hydrogen-containing modifiers of this invention as well as with other natural and synthetic resins, plasticizers, etc. The extent of substitution is controlled by the quantity of haloepoxy alkane that is reacted with the preformed phenolic-aldehyde resin. The remaining phenolic hydroxyl groups can be converted, if desired, into ether or ester groups by obvious reactions.

The viscosity of the resins used in making the surface coatings of this invention may be controlled somewhat by using mixtures of the epoxyalkoxy aryl resins having different molecular weights, for example, by using a mixture of 5 parts of such a resin wherein the "$m$" of the first formula given above has a value of 3, with 1 part of such a resin wherein "$m$" has a value of 10. Moreover, the viscosity of such resins may be controlled by dissolving the resin in a monomeric epoxyalkane derivative reactive with the resin, such as an aryl glycidyl ether of the formula $$Ar-O-(C)_n-C-C-$$
$$\diagdown O \diagup$$

wherein:

Ar represents an aromatic group, and the remainder of the formula is as previously defined herein for Z of the first formula;

for example $$C_6H_5-O-CH_2-CH-CH_2$$
$$\diagdown O \diagup$$

phenyl glycidyl ether;

$$(CH_3)_2CH-C_6H_4-O-CH_2-CH-CH_2$$
$$\diagdown O \diagup$$

isopropyl-phenyl glycidyl ether; ortho- and para-monobutyl-meta-cresyl glycidyl ethers, etc.;
and also other monomeric reactive epoxyalkane derivatives such as glycidyl acetate; mono- and di-glycidyl phthalates; etc.

The surface coating compositions of this invention can be applied to surfaces by brush, sprayer, spatula, roller or other convenient means. These compositions can be applied effectively to various types of surfaces such as wood, metal, glass, plastics, etc.

The invention as hereinbefore set forth is embodied in particular form and manner but may be variously embodied within the scope of the claims hereinafter made.

What is claimed is:

1. A polymeric composition comprising the reaction product of an epoxyalkoxy aryl resin and a member of the class consisting of drying oil and semi-drying oil fatty acids, and polyhydric alcohol esters thereof, said resin comprising an epoxyalkoxy aryl resin whose molecular structure is represented in major proportion by repeating units of the formula $$\left[ -CHR- \underset{R'}{\underset{X}{\bigodot}} \overset{O-Z}{\underset{Y}{}} \right]_m$$

wherein:

R is a substituent of the class consisting of hydrogen and alkyl, alkylene, aryl, aralkyl, alkaryl, cycloalkyl and furyl groups;

X and Y are substituents selected from the class consisting of hydrogen, chlorine, and alkyl and hydroxyl groups;

R' is a substituent of the class consisting of hydrogen, chlorine and alkyl, aryl, aralkyl, alkaryl and cycloalkyl groups;

$m$ is an integer having a value of at least 3; and

Z is a substituent of the class consisting of hydrogen and epoxyalkyl groups, at least one Z per polymer molecule being an epoxyalkyl group and said epoxyalkyl groups having the formula $$-\left[ (C)_n-C-C- \right]$$
$$\diagdown O \diagup$$

wherein $n$ is an integer having a value no greater than 8, and the unoccupied valences within the bracket of the formula are satisfied by substituents of the class consisting of hydrogen and alkyl groups of no more than 7 carbon atoms, the number of carbon atoms in any epoxyalkyl group totaling no more than 10 carbon atoms.

2. A polymeric composition comprising the reaction product of an epoxyalkoxy aryl resin and an unsaturated composition of the class consisting of drying oil and semi-drying oil fatty acids and polyhydric alcohol esters thereof, said resin comprising an epoxyalkoxy aryl resin made by the reaction of a chloroepoxyalkane of the formula $$Cl-(C)_n-C-C-$$
$$\diagdown O \diagup$$

with an alkaline salt of a fusible resin comprising an aldehyde condensation product of a phenol having the formula $$\underset{R'}{\underset{X}{\bigodot}} \overset{OH}{\underset{Y}{}}$$

wherein:

X and Y are substituents selected from the class consisting of hydrogen, chlorine, and alkyl and hydroxy groups;

R' is a substituent of the class consisting of hydrogen, chlorine, and alkyl, aryl, aralkyl, alkaryl and cycloalkyl groups;

$n$ being an integer having a value no greater than 8; and the unoccupied valences of the chloroepoxyalkane formula being satisfied by substituents of the class consisting of hydrogen and alkyl groups of no more than 7 carbon atoms, the number of carbon atoms in the chloroepoxyalkane totaling no more than 10 carbon atoms.

3. A polymeric composition of claim 2, in which the chloroepoxyalkane is epichlorohydrin.

4. A polymeric composition of claim 2, in which the fusible resin is a formaldehyde condensation product.

5. A polymeric composition of claim 2, in which the fusible resin is a formaldehyde-phenol resin.

6. A polymeric composition of claim 2, in which the fusible resin is a formaldehyde condensation product of an alkyl phenol of the class consisting of ortho and para alkyl phenols.

7. A polymeric composition of claim 6, in which the fusible resin is a formaldehyde-o-cresol resin.

8. A polymeric composition of claim 2, in which the epoxyalkoxy aryl resin has been at least partially reacted with the unsaturated composition.

9. A polymeric composition of claim 2, in which a minor amount of a metallic soap drier has been added.

10. A polymeric composition of claim 2, in which the unsaturated composition is a drying oil fatty acid.

11. A polymeric composition of claim 2, in which the unsaturated composition is a linseed oil fatty acid.

12. A polymeric composition of claim 9, in which the unsaturated composition is a dehydrated castor oil fatty acid.

13. A polymeric composition of claim 2, in which the polymerizable composition is a diglyceride of a drying oil fatty acid.

14. A polymeric composition of claim 2, in which the polymerizable composition is a diglyceride of linseed oil fatty acid.

15. A polymeric composition of claim 2, in which the fusible resin is a formaldehyde condensation product of an alkyl phenol of the class consisting of ortho and para alkyl phenols, and in which the unsaturated composition is a drying oil fatty acid.

16. A polymeric composition of claim 15, in which the drying oil fatty acid is linseed oil fatty acid.

17. A polymeric composition of claim 15, in which the drying oil fatty acid is a dehydrated castor oil fatty acid.

18. A polymeric composition of claim 15, in which the fusible resin is a formaldehyde-o-cresol resin.

19. A polymeric composition of claim 2, in which the fusible resin is a furfural condensation product.

References Cited in the file of this patent

UNITED STATES PATENTS

| Number | Name | Date |
|---|---|---|
| 2,040,212 | Orthner | May 12, 1936 |
| 2,060,410 | Balle | Nov. 10, 1936 |
| 2,076,624 | De Groote | Apr. 13, 1937 |
| 2,518,668 | De Groote et al. | Aug. 15, 1950 |
| 2,581,376 | De Groote et al. | Jan. 8, 1952 |

FOREIGN PATENTS

| Number | Country | Date |
|---|---|---|
| 576,177 | Germany | Apr. 20, 1933 |